United States Patent [19]

Hiruma et al.

[11] 4,232,333
[45] Nov. 4, 1980

[54] STREAK IMAGE ANALYZING DEVICE

[75] Inventors: Teruo Hiruma; Yutaka Tsuchiya, both of Hamamatsu, Japan

[73] Assignee: Hamamatsu Terebi Kabushiki Kaisha, Shizuoka, Japan

[21] Appl. No.: 1,186

[22] Filed: Jan. 5, 1979

[51] Int. Cl.³ .............................................. H04N 5/32
[52] U.S. Cl. ....................... 358/93; 358/111; 358/209
[58] Field of Search ............. 358/93, 107, 111, 209, 358/110, 113, 217

[56] References Cited

U.S. PATENT DOCUMENTS 3,644,046  2/1972  Ryan ........................................ 358/93
4,120,002  10/1978  Lieber ................................... 358/111

*Primary Examiner*—John C. Martin
*Assistant Examiner*—Michael Allen Masinick
*Attorney, Agent, or Firm*—Robert E. Burns; Emmanuel J. Lobato; Bruce L. Adams

[57] ABSTRACT

In a streak image analyzing device, a belt-shaped region perpendicular to the scanning lines on the scanning rastor of a television camera is set, the video signals only for the belt-shaped region are integrated every scanning line, the integration signals are stored in a memory having memory position, or addresses, provided respectively for the scanning lines, and the signal thus stored are read out to be displayed.

3 Claims, 4 Drawing Figures

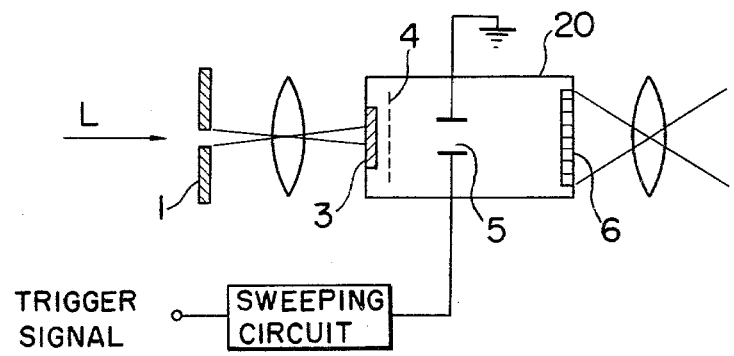
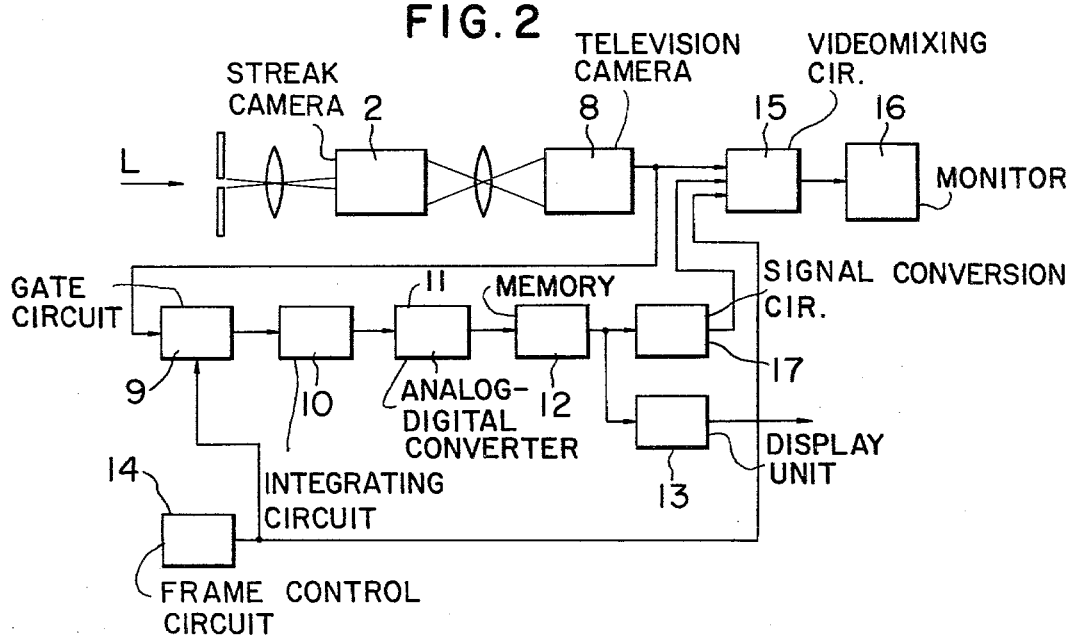

STREAK IMAGE ANALYZING DEVICE

BACKGROUND OF THE INVENTION

This invention relates to streak cameras, and more particularly to a streak image analyzing device for such a streak camera.

As shown in FIG. 1, in a streak camera, incident light entering through a slit 1 is converted into an electron image by means of the photoemitting surface 3 of a streak tube 20, and after being accelerated by an accelerating electrode 4, the electron image is scanned vertically in the longitudinal direction of the slit by a deflecting electrode 5, whereby the relation between time and intensity of incident light is displayed as the relation between position and intensity of the image on the phosphor screen.

Heretofore, a streak image analysis is performed by measuring with a photo densitometer the density distribution of a film obtained by photographing an image on a phosphor screen 6. However, this method is disadvantageous in that the analysis result is not of real time, and it requires intricate processes such as for instance a film processing; that is, it needs a number of processes to achieve the analysis.

SUMMARY OF THE INVENTION

Accordingly, an object of this invention is to eliminate the above-described difficulty accompanying a conventional streak image analysis method.

More specifically an object of the invention is to provide a streak image analyzing device in which a video signal obtained by television system is processed with real time, and the streak image of an incident light passed through a particular portion of a slit can be selectively analyzed, and furthermore the streak image of incident light at an optional position, in the longitudinal direction, of the slit, such as a streak image having a particular wavelength which is obtained when incident light is applied to a streak tube after being converted into a spectrum before the slit, can be analyzed.

The principle, nature and utility of the invention will become more apparent from the following detailed description and the appended claims when read in conjunction with the accompanying drawings.

BRIEF DESCRIPTION OF THE DRAWINGS

In the accompanying drawings:

FIG. 1 is an explanatory diagram showing the construction of a streak camera, already referred to;

FIG. 2 is a block diagram showing one example of a streak image analyzing device according to this invention;

One preferred example of a streak image analyzing device according to this invention will be described with reference to FIGS. 2, 3 and 4. As shown in FIG. 3, the slit image 7, 7, - - - and 7 of an incident light moving downwardly by sweeping are indicated as an image continuous in the sweeping direction indicated by the arrow on the phosphor surface 6 of a streak camera 2. A television camera 8 operates to perform the television photographing on the phosphor screen 6 of the streak camera 2 in such a manner that the sweeping direction (on the phosphor screen) of the streak camera is in parallel with the vertical scanning direction of the television camera, thereby to output a video signal as indicated by 31 in FIG. 4. This video signal 31 is applied through a video mixing circuit 15 to a monitor 16, where it is displayed. The video signal 31 is further applied to an integrating circuit 10 through a gate circuit 9 which is opened with the aid of a pulse 32 provided by a measurement window frame control circuit 14. The integrating circuit 10 subjects only a part of the video signal, which has passed through the gate circuit 9, to integration. The video signal thus treated is converted into a digital signal by an analog-to-digital converter 11 during the subsequent horizontal flyback period. The digital signal is stored in a respective address in a memory 12, and the integrating circuit 10 is reset. Since the digital conversion is carried out for processing the subsequent operation digitally, it goes without saying that the digital conversion is unnecessary to process the operation in an analog mode. The memory 12 is provided with memory addresses 1 through n corresponding to the number of scanning lines in one frame. The integration signal corresponding to the first scanning line in each frame is stored in the first memory address, the integration signal corresponding to the second scanning line is stored in the second memory addresses, and so forth. If, when the a-th scanning line is scanned by the television camera, the memory 12 is operated by the trigger pulse synchronized with the sweeping of the streak camera 2 and outputted from it the integration signal corresponding to the a-th scanning line is stored in the a-th address of the memory 12. Thereafter, the integration signals corresponding to the remaining scanning lines are stored in the respective addresses. After the remaining frame has been scanned in this manner, the scanning operation is returned to the first scanning line and accordingly the integration signal corresponding to the first scanning line is stored in the first address, and the scanning operation is continued up to the (a-1)th scanning line, similarly as above. This operation may be performed for only one frame, or it may be repeated for a plurality of frames. In the latter case, the integration signals are added to the stored data corresponding to each scanning line. However, it is most preferable that the number (m) of frames the scanning of which provides the best signal is obtained from the after image characteristic of the image tube of the television camera 8, and after the vertical synchronizing signals being counted for the m frames, the memory operation is suspended. The memory signals in the memory 12 show the time analysis waveform of incident light on the streak camera with the addresses as the successive times and with the memory signals in the addresses as the amplitude. Therefore, the digital output can be displayed on a dispaly unit 13 which is a printer in this case. Alternatively, if the digital output is subjected to digital-to-analog conversion to obtain an analog signal, then it can be displayed on the display unit 13 which is an oscilloscope or a pen recorder in this case. Furthermore, if the output signal is converted into a television video signal by a suitable signal conversion circuit 17, it can be displayed in superposition on the streak image on the monitor 16.

Figure 3:
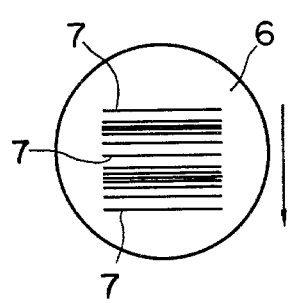
FIG. 3 is a diagram showing an image on the phosphor screen of a stream camera.
Figure 5:
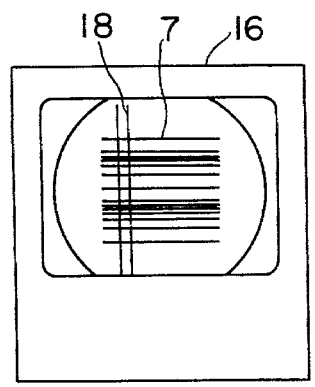
FIG. 5 is a diagram showing an image on a monitor screen.
Figure 4:
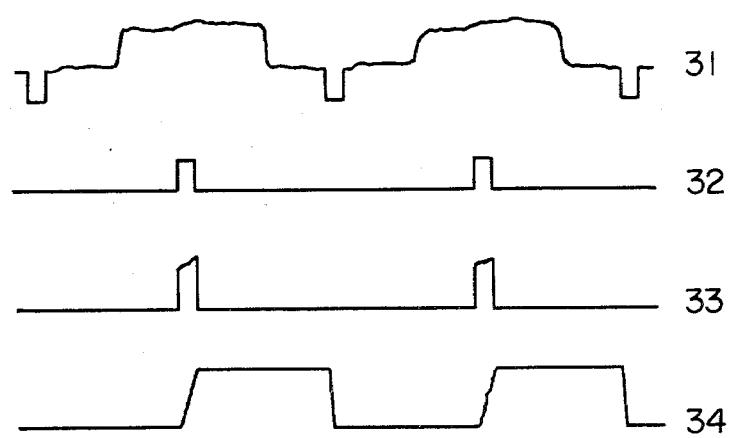
FIG. 4 is a waveform diagram for a description of the operation of the device shown in FIG. 2.

The aforementioned measurement window frame control circuit 14 operates to output a rectangular pulse which rises and falls with pulses which are obtained by delaying the horizontal synchronizing signal optionally by times $t_1$ and $t_2$ shorter than one effective horizontal scanning period. Therefore, the gate circuit 9 is opened in synchronization with the same part of the horizontal scanning line. As a result, the integration is made for a belt-shaped portion, perpendicular to the horizontal scanning lines, of the scanning rastor. Therefore, if the output signal of the measurement window frame control circuit 14 is superposed on the video signal by the video mixing circuit 15, and the resultant signal is applied to the monitor 16, then a belt-shaped image having a uniform width and extended linearly in the vertical direction, as indicated by 18 in FIG. 5, can be obtained. This belt-shaped portion is the streak image of the incident light which has passed through the same portion of the slit of the streak camera 2. Therefore, the signals stored in the memory 12 indicate the variations with time of the light which has passed through the same portion of the slit.

With the device thus organized, the streak image can be observed with the monitor 16 in advance in the case where it is possible to repeatedly obtain the incident light under the same conditon. Therefore, by presetting the belt-shaped measurement window frame to the portion where the steak image appears most clearly, a highly satisfactory waveform of the incident light can be obtained.

In the case where it is required to set a plurality of belt-shaped measurement window frames, the requirement may be accomplished by providing a plurality of combinations of the gate circuits, integrating circuits, analog-to-digital converters and memories, or it may be achieved by a method in which the gate circuit, integrating circuit and analog-to-digital converter is used in time division manner in one horizontal scanning period, the output signals are stored in memories provided for the plurality of measurement window frames, and thereafter the signals thus stored are read out and displayed for every window frame or displayed in superposition form simultaneously for all of the window frames. Alternatively, it may be accomplished by a method in which correlation is obtained by processing the data of each window frame or by processing the data of the window frames of the same scanning lines.

In the case when the relaxation phenomenon, accompanied by light emission, of a material excited by, for instance, laser light is observed with a streak camera, if the incident light to the photoemitting surface of the streak camera is dispersed in the slit direction by a spectroscope; and the window frame is set for a wavelength in question, then the time analyzed waveform of the light of the fixed wavelength can be obtained. In the case where there are more than two wavelengths in question if, the window frame is set for each of the wavelengths and the respective wave forms are displayed on the same display units. In this case, the relations in waveform between the wavelengths can be readily observed, and the relative variations between the wavelengths can be obtained by processing the data in the addresses corresponding to the window frames in the same scanning lines.

What is claimed is:
1. A streak image analyzing device which comprises:
  (a) gate means which is opened after a first predetermined time in an effective horizontal scanning period specified as desired from a horizontal synchronizing signal and is closed after a second predetermined time in said effective horizontal scanning period specified as desired from said horizontal synchronizing signal;
  (b) integrating means for integrating a video signal obtained by vertically scanning a streak image in the sweeping direction of said streak image for every horizontal scanning time with the aid of said gate means; and
  (c) memory means having memory positions in correspondence to scanning lines, for successively storing the integration value of said integrating means, so that data stored in said memory means are outputted as relations between time and intensity.

2. A device as claimed in claim 1, which comprises a plurality of systems each of which is made up of said gate means which is opened and closed as specified, said integrating means for performing integration for every horizontal scanning period, and said memory means having memory positions in correspondence to scanning lines.

3. A device as claimed in claim 1, in which a system comprising said gate means which is opened and closed as specified and said integrating means for performing integration for every horizontal scanning period, is used in time division manner.

* * * * *